United States Patent [19]

Steketee

[11] 4,193,728
[45] Mar. 18, 1980

[54] COLLECTING GROUPS FOR STRAW BALES AND LIFTING SAID GROUPS

[76] Inventor: Cornelis J. Steketee, 11, Korteweg, Driewegen, Netherlands

[21] Appl. No.: 845,218

[22] Filed: Oct. 25, 1977

[30] Foreign Application Priority Data

Nov. 10, 1976 [NL] Netherlands .......................... 7612502

[51] Int. Cl.² ................................................. B60P 3/00
[52] U.S. Cl. ...................................... 414/460; 414/111
[58] Field of Search .................... 214/6 B, 147 R, 392, 214/394, 396; 294/63 R, 87 R; 414/39, 111, 132, 460

[56] References Cited

U.S. PATENT DOCUMENTS

| 3,030,138 | 4/1962 | Bennett .............................. 294/63 R |
| 3,179,460 | 4/1965 | Gunzelmann ...................... 294/63 R |
| 3,259,260 | 7/1966 | Blair ................................ 214/147 R |
| 3,700,274 | 10/1972 | Paschal et al. ..................... 294/63 R |
| 3,952,881 | 4/1976 | Knudson .............................. 214/6 B |

FOREIGN PATENT DOCUMENTS 2238662  7/1973  France ..................................... 214/394

Primary Examiner—Lawrence J. Oresky
Attorney, Agent, or Firm—John P. Snyder

[57] ABSTRACT

The invention relates to a device for collecting and lifting groups of straw bales comprising a frame and members arranged beneath said frame for gripping the straw bales, said gripping members being formed by rods, spaced apart from and parallel to one another and adapted to move towards and away from one another in a direction transverse of the rods, in a manner such that straw bales dispersed on the field can be picked up one by one and be collected into groups for further transport.

5 Claims, 6 Drawing Figures

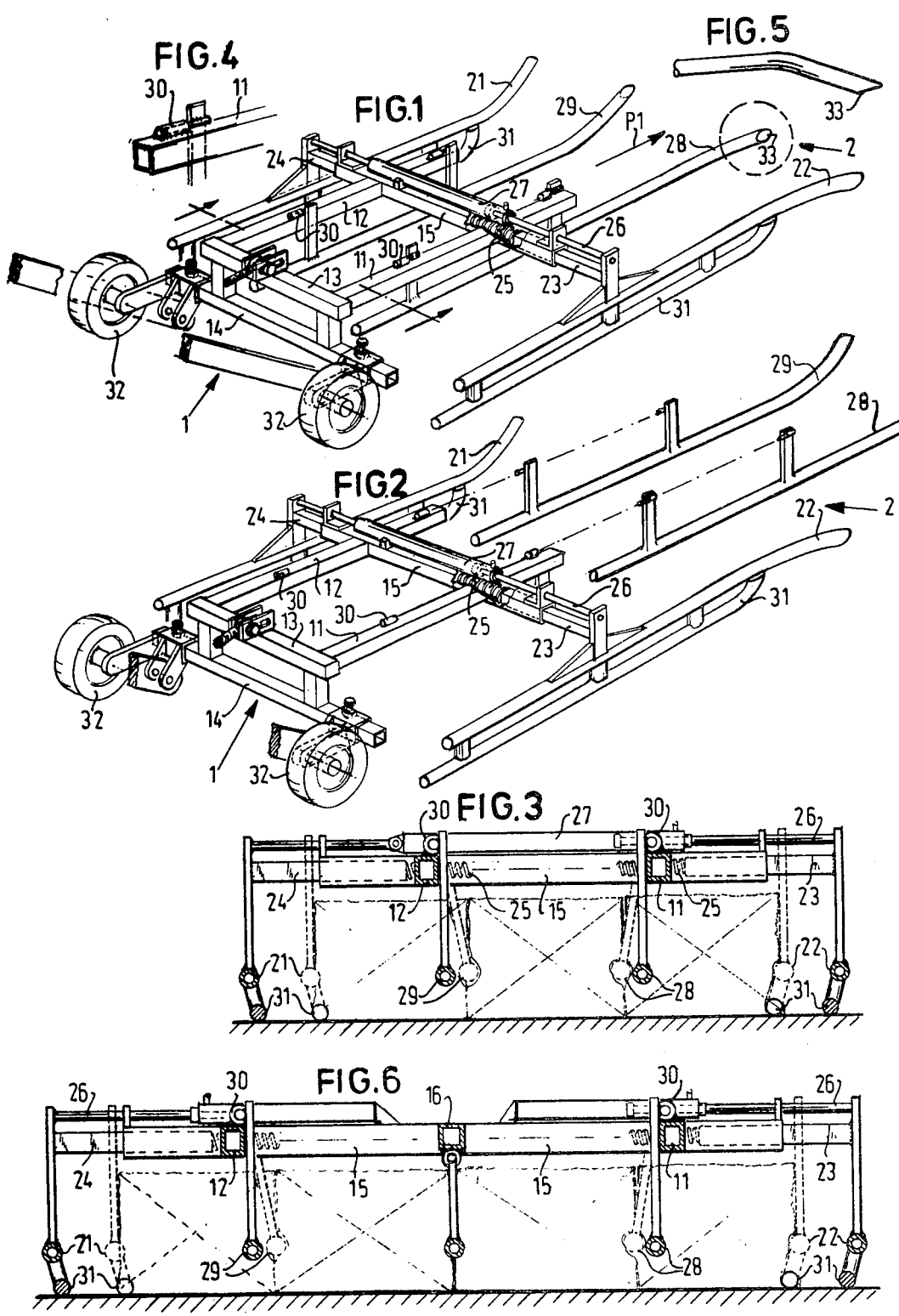

COLLECTING GROUPS FOR STRAW BALES AND LIFTING SAID GROUPS

The invention relates to a device for collecting and lifting groups of straw bales comprising a frame and members arranged beneath said frame for gripping the straw bales.

The invention has for its object to construct a device of the kind set forth in a manner such that straw bales dispersed on the field can be picked up one by one and be collected into groups for further transport. The devices hitherto known grip the straw bales at their surfaces. This has the disadvantage that straw bales lying in a depressed part of the field cannot be gripped by the device.

The invention obviates said disadvantage by providing the device with gripping members formed by rods, which are spaced apart from and parallel to one another and which are adapted to move towards and away from one another in a direction transverse of the rods.

The device according to the invention first captures the straw bales lying on the field between the parallel gripping members, which can then clamp the straw bales between them by moving towards one another. Since the straw bales are thus engaged on the sides, a straw bale lying on a lower level than the bales already picked up can be firmly gripped.

In a preferred embodiment at least one of the outermost gripping members can be driven in a lateral direction by a motor or the like. The other outermost member may then be fixedly mounted on the frame. If more than two members are used, it is advantageous to mount the gripping member located at the side of the movable outermost member so that, viewed in the direction of clamping, it can move therewith.

In a further embodiment comprising an odd number of members the middle member may be firmly secured to the frame, whereas the outermost gripping members are drivable in a transverse direction.

In order to pass the straw bales undisturbedly in between the gripping members it is preferred to bend the foremost portions of the members located at the side of the central longitudinal plane of the device away from said plane, the angle of bending being the larger the greater becomes the distance of the gripping member from said plane. In a further embodiment of the invention the outermost gripping members are provided on the bottom side with an additional clamping element. This element, which extends inwardly with respect to the gripping member, ensures a satisfactory clamping effect on the straw bales.

The device may finally be provided with means for attachment to tractors or similar vehicles, whilst the device may furthermore be provided with additional supporting means such as wheels, preferably caster wheels.

The invention will be described more fully with reference to a few embodiments.

In the drawing

FIG. 1 is a perspective plan view of a first embodiment of the device,

FIG. 2 is a perspective plan view of the same device, the innermost guide members being removed, FIG. 3 is a cross-sectional view of the device of the preceding Figures, FIG. 4 shows a detail of the hinge construction, FIG. 5 shows a detail of the front end of a guide member, FIG. 6 is a cross-sectional view like FIG. 3 of a further embodiment of the device.

Referring to the drawing reference numeral 1 designates the frame of the device, said frame comprising mainly a number of hollow beams, that is to say, two longitudinal beams 11 and 12, a transverse beam 13 and a beam 14 arranged beneath the former and a third transverse beam 15 interconnecting the longitudinal beams 11 and 12 at a distance from the beam 13.

Beneath the frame 1 gripping members 2 extend parallel to one another and to the longitudinal beams 11 and 12 and are at a distance from one another such that normal straw bales indicated by broken lines in FIG. 3 can be passed in between the rod-shaped gripping members 2.

The two outermost gripping members 21 and 22 are movable with respect to the frame in a transverse direction by means of a sliding structure. The sliding structure is formed by a beam 23 and 24 respectively slidable telescopically in the transverse beam 15, between which beams a compression spring 25 is provided in the hollow space of the beam 15. The free end of each sliding beam 23 and 24 respectively is secured to a stand fastened on the lower side to the rod-shaped clamping member 22. The stand is coupled at the top with the piston rod 26 of a cylinder 27 so that by energizing the cylinder the outermost clamping member 22 or 21 respectively can be drawn inwardly against the action of the compression spring 25.

The innermost clamping members 28 and 29 are connected through a hinge joint with the longitudinal beams 11 and 12 respectively. To this end each clamping member 28 and 29 is provided with two stands fastened at their top ends to the hinges 30 so that the pivot pins are located on the longitudinal beams 11 and 12 respectively. This disposition of the hinge has the advantage that the innermost clamping members 28 and 29 move towards the most adjacent outermost member as soon as this outermost member is drawn inwardly (see, in particular, FIG. 3). The return movement is, however, limited by the longitudinal beams 11 and 12 operating as stops. The pivotal structure is designed so that the innermost clamping members 28, 29 can be disengaged from the longitudinal beams concerned by lifting the pivot pin out of the sleeve (see FIG. 2).

On the bottom side the outermost clamping members 21, 22 are each provided with an additional clamping element 31. This element extends parallel to the clamping member, but with respect to the vertical line going through said member it is shifted inwardly (see, in particular, FIG. 3).

On the side of the beams 13 and 14 the frame 1 is provided with means for attachment to the three-point lift of an agricultural tractor or the like. The lower beam 14 is provided with a pair of wheels 32. The coupling means are such that the tractor can propel the device in the direction of the arrow P1 across the field, the device extending just above the soil and the wheels 32 serving as supports on the rear side. The device can be lifted by the three-point lifting device of the tractor.

The device operates as follows.

The straw bales dispersed on the field are "captured" between the guide elements 21-29, 29-28, 28-22, the number of straw bales getting one after the other between a pair of gripping elements being dependent upon the length thereof. To ensure undisturbed capture of the bales the front ends of the gripping elements are curved so that the front ends are bent over with respect to the central longitudinal plane. The angle of bending of the element 22 is larger than that of the element 28 so that the opening of entry between the elements has anywhere the same width, which exceeds the distance between the straight portions of the gripping members.

When a sufficient number of straw bales is received between the elements, cylinder 27 is energized and the outermost gripping members 21, 22 will move inwardly, thus shifting the straw bales towards the centre of the device. This is enabled by the yielding movement of the innermost gripping members 28, 29. Owing to the inwardly shifted clamping elements 31 an upwardly inclined pressure is exerted on the outermost bales on the lower side, which is intensified by the upward swing of the innermost gripping members 28, 29. This results in an arcuate clamping position of the bales so that an optimum effect of the device is ensured. The bales can then be displaced in groups, lifted or treated otherwise.

After the bales are arranged at the desired place, the cylinder 27 can be de-energized so that the compression spring 25 pushes the outermost members away sideways. After the frame 1 is lifted by means of the three-point lift, the innermost clamping members 28, 29 are withdrawn from between the straw bales. Thus the bales are united in a group.

In order to re-grip and lift the group of bales, the innermost elements 28, 29 have to be removed, which is allowed by the releasable hinge structure.

FIG. 5 is a plan view of a front end of an inner gripping element, in which the rod-shaped element is flattened on its side remote from the central longitudinal plane of the device to form a surface 33, it being thus avoided that the captured bales should stick thereto.

FIG. 6 shows a broader embodiment than that described above; in this case five gripping members are arranged parallel to one another. The central one of the five elements is rigidly secured to the longitudinal beam 16, whereas the outermost gripping elements, like in the preceding embodiment, are movable inwardly, the neighbouring elements being movable in said sense being pivotally coupled with the frame. This device operates like the embodiment described above.

A higher device may be designed so that a group of more than one layer of straw bales can be gripped and lifted, the layers being formed in the manner described above. The higher device can be obtained in a simple manner by enlarging the height of the gripping members.

Other embodiments are possible within the scope of the invention.

I claim:

1. In a vehicle for picking up bales, a device for collecting groups of bales, comprising a horizontal frame and gripping members depending from said frame for gripping the bales, the gripping members being formed by a plurality of generally horizontally rod-shaped elements disposed in spaced, parallel relation to one another and the members being movable towards and away from one another in a direction transverse of the direction of the rods, means for driving at least one outermost gripping member in said transverse direction, and at least that intermediate gripping member adjacent the movable outermost member being pivotally mounted on the frame so as to be swingable inwardly and stop means for limiting outward return movement of said intermediate gripping member to a substantially vertical position.

2. In a vehicle as claimed in claim 1, wherein a central gripping member is rigidly secured to said frame at the center thereof, and two outermost gripping members are arranged so as to be movable inwardly in a transvers direction.

3. In a vehicle as claimed in claim 2, wherein the foremost parts of said rod-shaped elements are bent outwardly, the angle of bending being larger than the greater distance of said rod-shaped elements from the center of said frame.

4. In a vehicle as claimed in claim 2, wherein said intermediate gripping member is releasably coupled with the frame.

5. In a vehicle as claimed in claim 4, wherein the bottom side of the outermost gripping members are each provided with an additional clamping element.

* * * * *